United States Patent
Chang et al.

(10) Patent No.: US 11,213,022 B2
(45) Date of Patent: Jan. 4, 2022

(54) TRANSMISSION MECHANISM OF SPINNING FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: OKUMA FISHING TACKLE CO. LTD., Taichung (TW)

( * ) Notice: Subject to any disclaimer, the term of this patent is extended or adjusted under 35 U.S.C. 154(b) by 0 days.

(21) Appl. No.: 17/023,789

(22) Filed: Sep. 17, 2020

(65) Prior Publication Data

US 2021/0076652 A1 Mar. 18, 2021

(30) Foreign Application Priority Data

Sep. 17, 2019 (TW) .................................. 108133332

(51) Int. Cl.
*A01K 89/01* (2006.01)
*A01K 89/015* (2006.01)
*A01K 89/00* (2006.01)

(52) U.S. Cl.
CPC ........ *A01K 89/0183* (2015.05); *A01K 89/006* (2013.01)

(58) Field of Classification Search
CPC . A01K 89/004; A01K 89/006; A01K 89/0183
See application file for complete search history.

(56) References Cited

U.S. PATENT DOCUMENTS

| 3,198,457 | A | * | 8/1965 | Holahan | A01K 89/057 242/268 |
| 4,196,867 | A | * | 4/1980 | Miller | A01K 89/004 242/249 |
| 5,540,397 | A | * | 7/1996 | Yoshikawa | A01K 89/006 242/311 |
| 6,966,515 | B2 | * | 11/2005 | Nishikawa | A01K 89/004 242/282 |
| 8,950,697 | B2 | * | 2/2015 | Takamatsu | A01K 89/006 242/282 |
| 2018/0055025 | A1 | * | 3/2018 | da Rosa | A01K 89/011221 |

* cited by examiner

*Primary Examiner* — Emmanuel M Marcelo
(74) *Attorney, Agent, or Firm* — Muncy, Geissler, Olds & Lowe, P.C.

(57) ABSTRACT

A transmission mechanism of a spinning fishing reel includes a transmission shaft having a shaft body with an axial hole and a cut slit communicating with the axial hole, a gear disc having a tube portion, through which the shaft body is inserted such that the gear disc is drivenable by the transmission shaft to rotate, and a bolt having a head and a shank. The shank is screwingly threaded into the axial hole in a way that the head of the blot is abutted against an end of the tube portion of the gear disc, such that the outer periphery of the shaft body is expanded to firmly abut against the inner periphery of the tube portion. As such, the operational smoothness and stability of the product are enhanced by the transmission mechanism. Further, the transmission mechanism can be easily assembled with low manufacturing cost.

9 Claims, 4 Drawing Sheets

TRANSMISSION MECHANISM OF SPINNING FISHING REEL

BACKGROUND OF THE INVENTION

1. Field of the Invention

The present invention relates generally to a spinning fishing reel and more particularly, to a transmission mechanism of a spinning fishing reel.

2. Description of the Related Art

A conventional spinning fishing reel is composed of a transmission shaft having a hexagonal outer periphery, and a gear disc. An end of the transmission shaft is mounted to a handle of the fishing reel, and the gear disc is rotatably mounted inside a main body of the fishing reel. The gear disc includes a tube portion having a hexagonal inner periphery. The transmission shaft is inserted into and engaged with the tube portion of the gear disc, such that when the user turns the handle, the rotary force can be transmitted through the transmission shaft and the gear disc to a rotor and a line spool, which are mounted to the main body, thereby facilitating the fishing line to be evenly wound around the line spool. To facilitate assembly or because of the manufacturing tolerance, the transmission shaft and the tube portion of the gear disc of the conventional spinning fishing reel are configured having a certain gap therebetween. That is, the transmission shaft and the tube portion of the gear disc of the conventional spinning fishing reel are not firmly abutted with each other; otherwise, the transmission shaft will be difficultly inserted into the tube portion during assembly. However, the aforesaid gap may cause transmission lag, resulting in that the transmission shaft cannot immediately drive the gear disc to rotate when the transmission shaft rotates. As a result, the conventional spinning reel may have a low operational smoothness to user. If the aforesaid gap is decreased in designing the transmission mechanism of the spinning fishing reel, not only the manufacturing conditions must be strictly controlled to cause increase of the manufacturing cost but also the difficulty in assembly will be raised.

A known solution for solving the above-mentioned problem is to provide a mortise-and-tenon coupling structure at an end of the handle adjacent to the gear disc and an end of the tube portion adjacent to the handle. As soon as the transmission shaft is inserted into the tube portion, the handle is engaged with the tube portion, such that when the user turns the handle, the gear disc is driven by the handle to rotate. However, because of stress concentration, the engagement portions between the handle and the tube portion are liable to break after long-term use, causing deterioration of stability of product. Further, because of dimension inaccuracy and tolerance in manufacturing, a gap may still exist in the mortise-and-tenon coupling structure between the handle and the tube portion. As a result, the deterioration of the user's operational smoothness cannot be completely solved. Therefore, the improvement of the foregoing deficiencies becomes a technical issue to be solved by the person skilled in the art.

SUMMARY OF THE INVENTION

The present invention has been accomplished in view of the above-noted circumstances. It is an objective of the present invention to provide a transmission mechanism of a spinning fishing reel, which can enhance user's operational smoothness and stability of product.

Another objective of the present invention is to provide a transmission mechanism, which has a simple structure and can be easily assembled so as to reduce the manufacturing cost.

To attain the above objectives, the present invention provides a transmission mechanism of a spinning fishing reel, which comprises a transmission shaft, a gear disc and a bolt. The transmission shaft is rotatable about an axis and provided with a shaft body having a non-circular outer periphery, a first end, and a second send opposite to the first end, an axial hole recessed from the first end of the shaft body along the axis, an internal thread section on a wall of the axial hole, and at least one cut slit extending from the first end of the shaft body toward the second end of the shaft body and communicating with the axial hole. The gear disc includes a tube portion with a non-circular inner periphery, through which the shaft body of the transmission shaft is inserted such that the gear disc is drivenable by the transmission shaft to rotate. The bolt includes a head, a shank extending from the head, and an external thread section on the shank. The shank of the bolt is inserted into the axial hole in a way that the external thread section is screwingly engaged with the internal thread section, and the head of the blot is abutted against an end of the tube portion of the gear disc, such that a part of the outer periphery of the shaft body, which is adjacent to the first end of the shaft body, is firmly abutted against the inner periphery of the tube portion of the gear disc.

By means of the aforesaid structural features, the transmission mechanism of the spinning fishing reel can enhance the user's operational smoothness and the stability of product. Further, the transmission mechanism of the spinning fishing reel has a simple structure and can be easily assembled, thereby reducing the manufacturing cost thereof.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
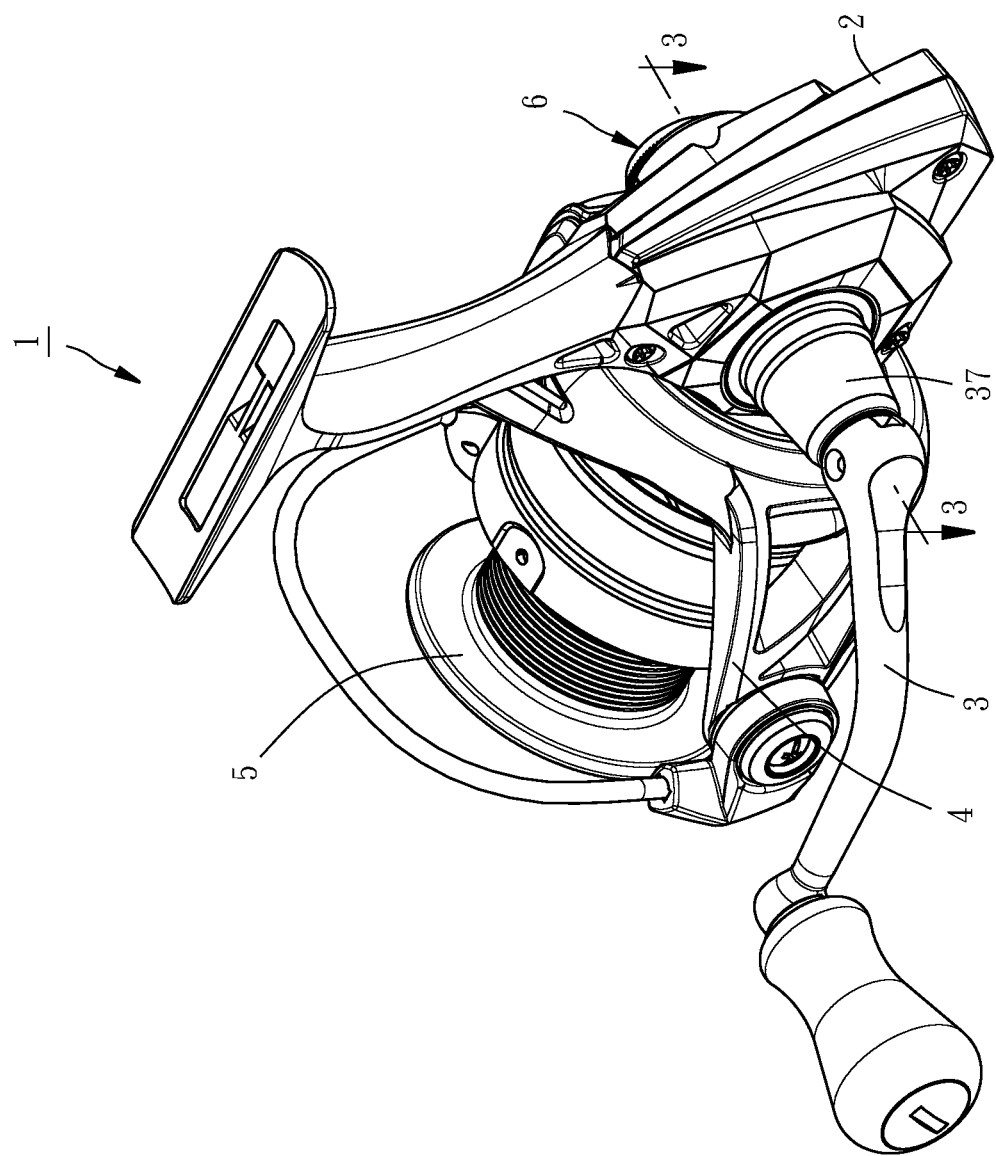
FIG. 1 is a perspective view of a spinning fishing reel according to an embodiment of the present invention.
Figure 2:
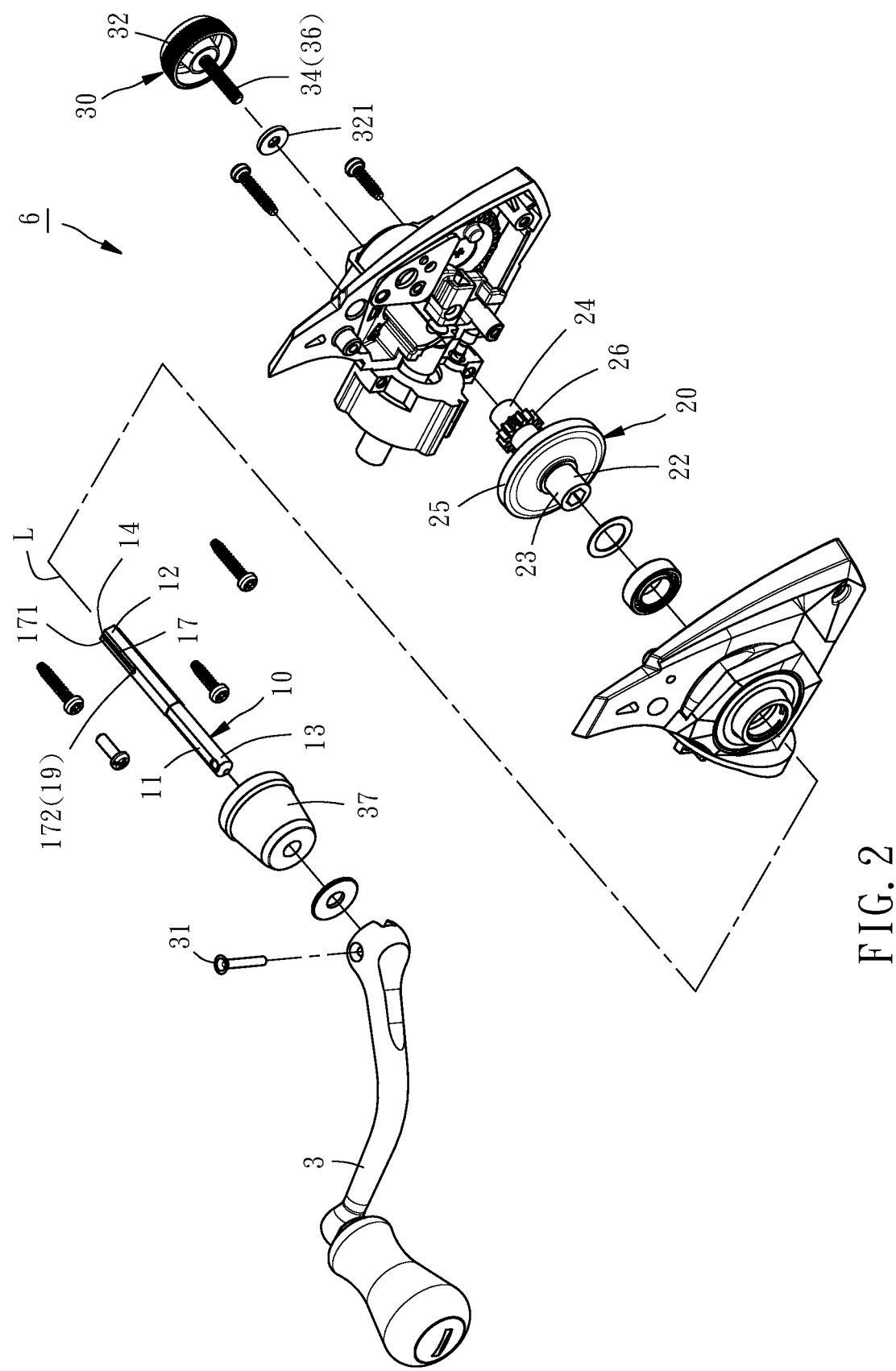
FIG. 2 is an exploded perspective view of a transmission mechanism of the spinning fishing reel of the embodiment of the present invention.

Hereunder a preferred embodiment will be detailedly described with accompanying drawings for illustrating technical features and structure of the present invention. As shown in FIGS. 1 and 2, a spinning fishing reel 1 provided by an embodiment of the present invention is composed of a main body 2, a handle 3 rotatably mounted to a lateral side of the main body 2, a sleeve member 37 located between the maim body 2 and the handle 3, a rotor 4 rotatably mounted to a front side of the main body 2, a line spool 5 axially reciprocatingly moveably mounted to the front side of the main body 2, and a transmission mechanism 6 mounted to the main body 2 and connected with the handle 3, such that the rotation of the handle 3 can be transmitted to the rotor 4 and the line spool 5 via the transmission mechanism 6. When a user turns the handle 3, the rotor 4 will rotate to evenly wind the fishing line (not shown in the drawings) around the line spool 5. As being detailedly described hereunder, the transmission mechanism 6 is composed of a transmission shaft 10, a gear disc 20, and a bolt 30.

Figure 3:
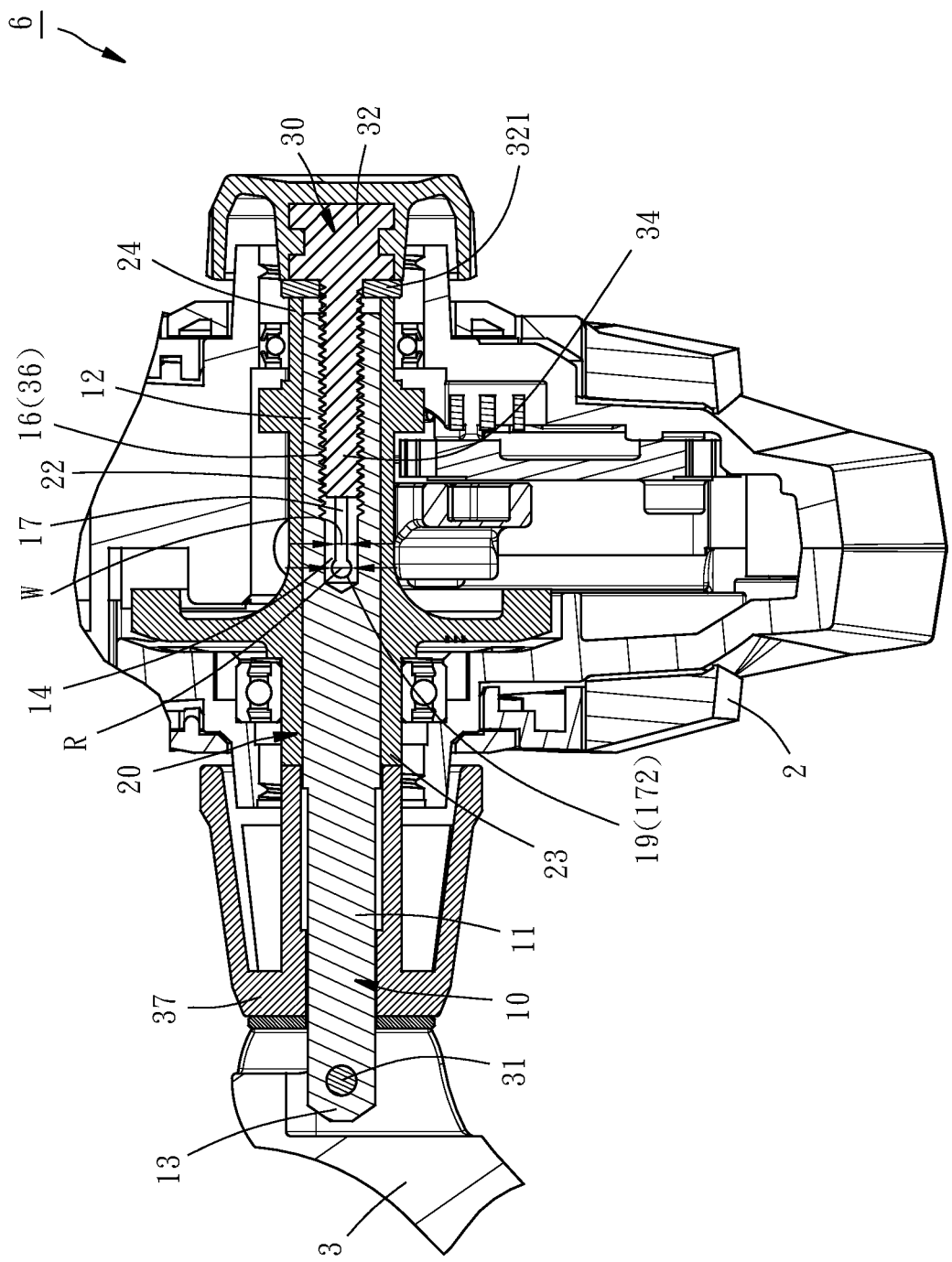
FIG. 3 is a sectional view taken alone line 3-3 of FIG. 1.
Figure 4:
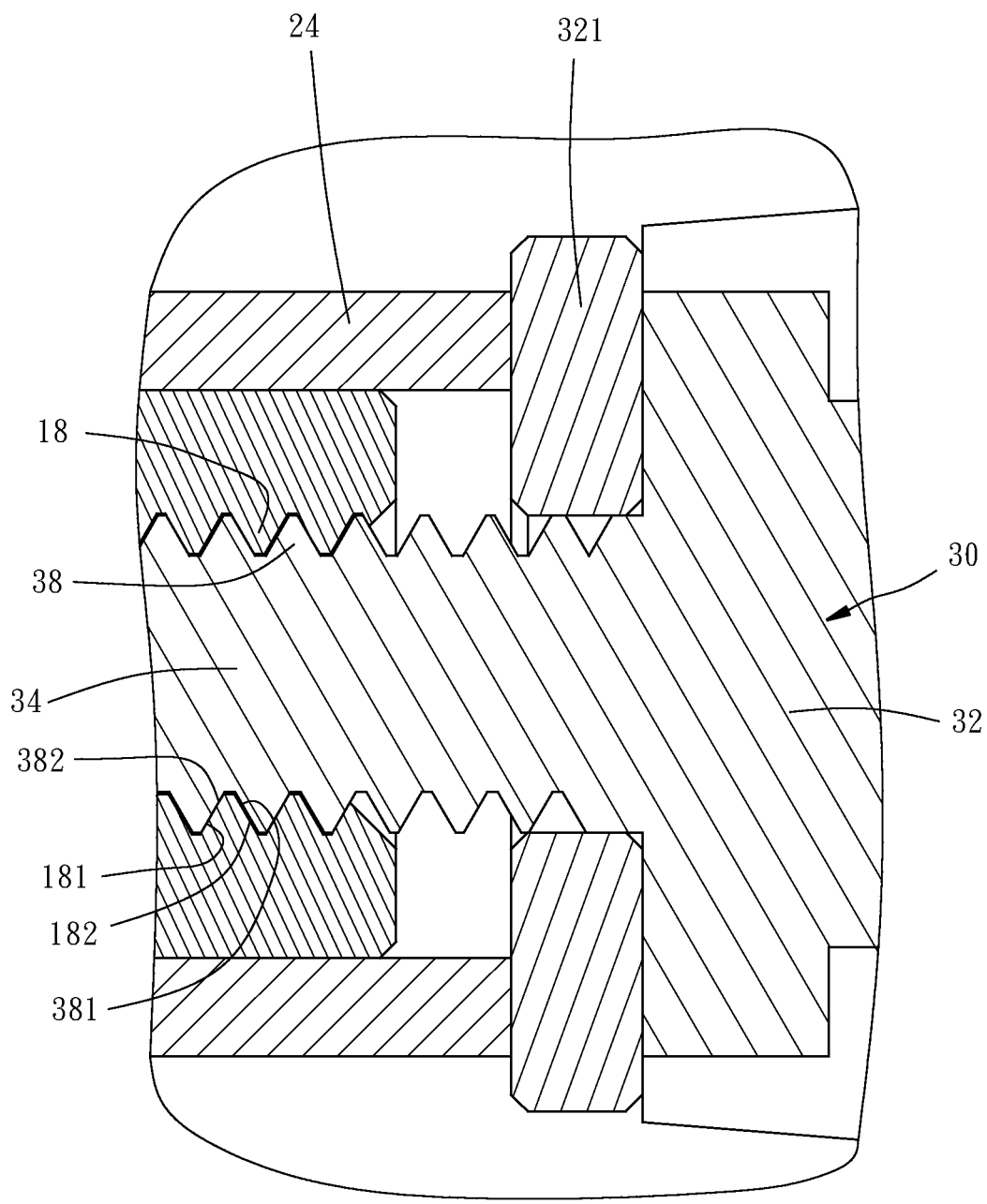
FIG. 4 is an enlarged view of a part of FIG. 3.

Referring to FIGS. 2 and 3, the transmission shaft 10 is rotatable about an axis L. The transmission shaft 10 includes a shaft body 11 having an outer periphery with a hexagonal cross-section, an axial hole 14, an internal thread section 16, and two cut slits 17 arranged opposite to each other. The shaft body 11 has a first end 12 and a second end 13 opposite to the first end 12. The second end 13 is connected with the handle 3 by a pin 31, such that the transmission shaft 10 can be driven by the handle 3 to rotate relative to the main body 2 about the axis L. The shaft hole 14 is inwardly recessed from the first end 12 of the shaft body 11 along the axis L. The internal thread section 16 is formed on a wall of the axial hole 14 at the place that is adjacent to the first end 12. The internal thread section 16 includes a spiral internal thread tooth 18. As shown in FIG. 4, the internal thread tooth 18 has a first side 181 facing the handle 3, and a second side 182 opposite to the first side 181. The two cut slits 17 extend from the first end 12 of the shaft body 11 toward the second end 13 of the shaft body 11 at a predetermined distance in a way that the cut slits 17 are in communication with the axial hole 14. The two cut slits 17 extend in a direction parallel to the axis L, and each of the cut slits 17 has an open end 171 adjacent to the bolt 30, and a closed end 172 remote from the bolt 30. The closed end 172 of the cut slit 17 has a through hole portion 19 having a diameter R greater than a width W of the cut slit 17. With the arrangement of the two cut slits 17, the shaft body 11 is deformable upon receiving an external force.

The gear disc 20 is rotatably mounted inside the main body 2. The gear disc 20 includes a tube portion 22 and two annular tooth portions 25 and 26 radially and outwardly extending from an outer periphery of the tube portion 22. The tube portion 22 has an inner periphery with a hexagonal cross-section. The inner periphery of the tube portion 22 is allowable insertion of the shaft body 11 of the transmission shaft 10 therethrough. Because the shape of the inner periphery of the tube portion 22 is substantially complementary to the shape of the outer periphery of the shaft body 11, the transmission shaft 10 and the gear disc 20 can synchronously rotate relative to the main body 2 about the axis L, such that the rotary power of the gear disc 22 can be transmitted to the rotor 4 and the line spool 5 by the two annular tooth portions 25 and 26 that drive other components. Further, the tube portion 22 of the gear disc 20 has a first end 23 adjacent to the handle 3, and a second end 24 adjacent to the bolt 30.

It is to be mentioned, in order to enable that the transmission shaft 10 and the gear disc 20 can rotate synchronously, the cross-sections of the inner periphery of the tube portion 22 and the outer periphery of the shaft body 11 may be configured having various modifications. For example, the outer periphery of the shaft body 11 and the inner periphery of the tube portion 22 may both have a rectangular cross-section. In fact, as long as the outer periphery of the shaft body 11 and the inner periphery of the tube portion 22 both have a non-circular profile to result in that at least a part of the outer periphery of the shaft body 11 is abutted against the inner periphery of the tube portion 22, the transmission shaft 10 and the gear disc 20 will synchronously rotate even if the outer periphery of the shaft body 11 and the inner periphery of the tube portion 22 have different profiles or are not completely complementary to each other.

The bolt 30 includes a head 32, a shank 34 extending outwardly from a center of the head 32, and an external thread section 36 on the shank 34. The external thread section 36 includes a spiral external thread tooth 38 having a first side 381 facing the handle 3, and a second side 382 facing the head 32 of the bolt 30. The shank 34 of the bolt 30 is inserted into the axial hole 14 of the transmission shaft 10 in a way that the external thread section 36 is screwingly engaged with the internal thread section 16. At this state, the open ends 171 of the cut slits 17 are located adjacent to the head 32 of the bolt 30 and the closed ends 172 are remote from the head 32.

In the present embodiment, a washer 321 is provided between the head 32 of the bolt 30 and the second end 24 of the tube portion 22 so as to prevent rub of the head 32 with the tube portion 22. In another embodiment, the washer 321 can be omitted. It is to be mentioned that the sleeve member 37 is sleeved along the axis L onto the shaft body 11 of the transmission shaft 10 and located between the handle 3 and the gear disc 20 in a way that the sleeve member 37 has an end abutted against the handle 3 and the other end abutted against the first end 23 of the tube member 22 of the gear disc 20.

To assemble the transmission mechanism 6, the transmission shaft 10, which is connected to the handle 3 in advance, is inserted into the gear disc 20. Specifically speaking, the first end 12 of the transmission shaft 10 is inserted into the tube portion 22 via the first end 23 of the gear disc 20 until an end of the sleeve member 37 is abutted against the first end 23. At this state, the first end 12 of the transmission shaft 10 is located adjacent to the second end 24 of the tube portion 22 without extending out of the tube portion 22.

Further, the shank 34 of the bolt 30 is inserted into the tube portion 22 of the gear disc 20 and the axial hole 14 of the transmission shaft 10 via the second end 24 in a way that the external thread section 36 of the bolt 30 is screwingly engaged with the internal thread section 16 of the transmission shaft 10. As the bolt 30 is tighten with the transmission shaft 10, the washer 321 is clamped between the head 32 and the second end 24 of the tube portion 22, and the two ends of the sleeve member 37 are abutted against the handle 3 and the first end 23 of the tube portion 22, respectively. At this state, as shown in FIG. 4, the bolt 30 will impart a force exerting on the transmission shaft 10 in a direction toward the right side of FIG. 4, resulting in that the second side 382 of the external thread tooth 38 is firmly abutted with the first side 181 of the internal thread tooth 18, so that a gap exists between the second side 182 of the internal thread tooth 18 and the first side 381 of the external thread tooth 38. The rightward force will generate an outwardly radial component force exerting on the transmission shaft 10 via the contact surfaces between external thread tooth 38 and the internal thread tooth 18 to force the caliber of the axial hole 14 of the shaft body 11 to expand. That is, with the arrangement of the two cut slits 17 on the shaft body 11, the shaft body 11 will expand and deform due to the radial component of the rightward force. As a result, a part of the outer periphery of the shaft body 11 will be firmly abutted against the inner periphery of the tube portion 22 of the gear disc 20 so as to tightly couple the transmission shaft 10 with the gear disc 20. Therefore, as soon as the user turns the handle 3, the gear disc 20 will be immediately driven to rotate without any delay of power transmission caused by the gap existing between the transmission shaft 10 and the gear disc 20.

It is to be mentioned that when the shaft body 11 expands due to the engagement of the external thread section 36 of the bolt 30, the through hole portion 19 may disperse the stress concentrating at the closed end 172 of the cut slit 17 so as to avoid break of the cut slit 17 due to stress concentration. To achieve this function, the diameter of the through hole portion 19 may be greater than or equal to the width W of the cut slit 17.

With the above-mentioned structural features, the transmission mechanism 6 provided by the present invention can solve the problem of the prior art that there is a gap between the transmission shaft and the gear disc. The transmission mechanism 6 can not only enhance the user's operational smoothness but also avoid the problem of the prior art that the engagement portions of the mortise-and-tenon coupling structure between the handle and the tube portion of the gear disc are liable to break, thereby enhancing the stability of product. Further, the transmission mechanism 6 has a simple structure and can be easily assembled, thereby lowering the manufacturing cost thereof.

It is to be understood that the configuration and number of the cut slit 17 may be modified with various variations. For example, the cut slit 17 may have no through hole portion 19 or may have a wavy profile. The extending direction of the cut slit 17 is not limited to be parallel to the axis L, and the shaft body 11 may be provided with one cut slit 17 only. In fact, the shaft body 11 may be provided with one or more cut slits as long as the shaft body 11 of the transmission shaft 10 can expand upon receiving an external force.

The invention being thus described, it will be obvious that the same may be varied in many ways. For example, the axial hole 14 may penetrate through the shaft body 11 of the transmission shaft 10. Such variations are not to be regarded as a departure from the spirit and scope of the invention, and all such modifications as would be obvious to one skilled in the art are intended to be included within the scope of the following claims.

What is claimed is:

1. A transmission mechanism of a spinning fishing reel, comprising:
    a transmission shaft rotatable about an axis and provided with a shaft body having a non-circular outer periphery, a first end, and a second send opposite to the first end, an axial hole recessed from the first end of the shaft body along the axis, an internal thread section on a wall of the axial hole, and at least one cut slit extending from the first end of the shaft body toward the second end of the shaft body and being in communication with the axial hole;
    a gear disc including a tube portion with a non-circular inner periphery, through which the shaft body of the transmission shaft is inserted such that the gear disc is drivenable by the transmission shaft to rotate; and
    a bolt including a head, a shank extending from the head, and an external thread section on the shank;
    wherein the shank of the bolt is inserted into the axial hole of the transmission shaft in a way that the external thread section is screwingly engaged with the internal thread section, and the head of the blot is abutted against an end of the tube portion of the gear disc, such that a part of the outer periphery of the shaft body, which is adjacent to the first end of the shaft body, is firmly abutted against the inner periphery of the tube portion of the gear disc.

2. The transmission mechanism of the spinning fishing reel as claimed in claim 1, wherein the at least one cut slit includes an open end adjacent to the head of the bolt, and a closed end remote from the open end; the closed end is provided with a through hole portion having a diameter greater than or equal to a width of the at least one cut slit.

3. The transmission mechanism of the spinning fishing reel as claimed in claim 1, wherein the at least one cut slit extends in a direction parallel to the axis.

4. The transmission mechanism of the spinning fishing reel as claimed in claim 1, wherein the outer periphery of the shaft body has a hexagonal shape.

5. The transmission mechanism of the spinning fishing reel as claimed in claim 4, wherein the inner periphery of the tube portion of the gear disc has a hexagonal shape.

6. The transmission mechanism of the spinning fishing reel as claimed in claim 1, wherein the inner periphery of the tube portion of the gear disc has a hexagonal shape.

7. The transmission mechanism of the spinning fishing reel as claimed in claim 1, wherein the spinning fishing reel comprises a main body, a handle rotatably mounted to a side of the main body, a rotor rotatably mounted to a front side of the main body; the transmission shaft is adapted for being connected with the handle, and the gear disc is adapted for being mounted inside the maim body for transmitting rotation of the handle via the transmission mechanism to the rotor to drive the rotor to rotate.

8. The transmission mechanism of the spinning fishing reel as claimed in claim 7, wherein the spinning fishing reel comprises a sleeve member sleeved onto the shaft body of the transmission shaft and located between the handle and the gear disc.

9. The transmission mechanism of the spinning fishing reel as claimed in claim 8, wherein the tube portion of the gear disc is adapted for being abutted by an end of the sleeve member.

* * * * *